(12) United States Patent
Milburn

(10) Patent No.: US 7,048,008 B2
(45) Date of Patent: May 23, 2006

(54) GAS-PANEL ASSEMBLY

(75) Inventor: Matthew L. Milburn, Felton, CA (US)

(73) Assignee: Ultra Clean Holdings, Inc., Menlo Park, CA (US)

( * ) Notice: Subject to any disclaimer, the term of this patent is extended or adjusted under 35 U.S.C. 154(b) by 178 days.

(21) Appl. No.: 10/823,974

(22) Filed: Apr. 13, 2004

(65) Prior Publication Data

US 2005/0224120 A1    Oct. 13, 2005

(51) Int. Cl.
*F16K 11/10* (2006.01)
(52) U.S. Cl. .................................... 137/884
(58) Field of Classification Search ............. 137/269, 137/270, 271, 597, 884
See application file for complete search history.

(56) References Cited

U.S. PATENT DOCUMENTS

| | | | |
|---|---|---|---|
| 4,008,736 A | 2/1977 | Wittmann-Liebold et al. | |
| 4,807,660 A | 2/1989 | Aslonion | |
| 5,361,805 A | 11/1994 | Moyeux | |
| 5,368,062 A | 11/1994 | Okumura et al. | |
| 5,488,915 A | 2/1996 | McNeill | |
| 5,488,925 A | 2/1996 | Kumada | |
| 5,529,088 A | 6/1996 | Asou | |
| 5,605,179 A | 2/1997 | Strong et al. | |
| 5,657,786 A | 8/1997 | DuRoss et al. | |
| 5,713,582 A | 2/1998 | Swensen et al. | |
| 5,720,317 A | 2/1998 | Nimberger | |
| 5,730,448 A | 3/1998 | Swensen et al. | |
| 5,735,532 A | 4/1998 | Nolan et al. | |
| 5,735,533 A * | 4/1998 | Nolan et al. | 277/630 |
| 5,819,782 A | 10/1998 | Itafuji | |
| 5,836,355 A | 11/1998 | Markulec et al. | |
| 5,860,676 A | 1/1999 | Brzezicki et al. | |
| 5,983,933 A | 11/1999 | Ohmi et al. | |

(Continued)

FOREIGN PATENT DOCUMENTS

DE    26 30 050 A1    1/1978

(Continued)

OTHER PUBLICATIONS

Uchisawa, O. et al., "Compact Gas Control System", 18th Workshop on ULSI Ultra Clean Technology, Physics and Chemistry of Specialty Gases for Advanced Semiconductor Processings, pp. 15-24, 1992.

*Primary Examiner*—John Fox
(74) *Attorney, Agent, or Firm*—Peter J. Dehlinger; Perkins Coie LLP

(57) ABSTRACT

A fluid manifold and components for constructing the fluid manifold having a plurality of separate fluid-flow pathways. The manifold comprises a plurality of pipe modules which form said fluid-flow pathways and a plurality of block modules which can be joined together in various configurations with the pipe modules to form the fluid manifold. The pipe modules each include an elongate pipe section and two or more connectors, each having a proximal end section joined in fluid communication with the elongate pipe section and a distal end section terminating at a support structure. Each of the block modules provide (i) at least one groove formed in the block module, such that the confronting grooves in two block modules, when joined together, form an opening for receiving at least a part of the connector of the pipe module, thus to support the pipe module in the joined block modules, and, (ii) a structure for holding joined block sections in alignment with each other, wherein block sections can be removed and replaced without removal of adjacent block or pipe modules.

21 Claims, 6 Drawing Sheets

U.S. PATENT DOCUMENTS

| | | |
|---|---|---|
| 5,992,463 A | 11/1999 | Redemann et al. |
| 6,007,108 A * | 12/1999 | Braun .................... 285/125.1 |
| 6,036,107 A * | 3/2000 | Aspen et al. ............... 239/170 |
| 6,039,360 A | 3/2000 | Ohmi et al. |
| 6,085,783 A | 7/2000 | Hollingshead |
| 6,123,340 A | 9/2000 | Sprafka et al. |
| 6,142,539 A | 11/2000 | Redemann et al. |
| 6,189,570 B1 | 2/2001 | Redemann et al. |
| 6,192,938 B1 | 2/2001 | Redemann et al. |
| 6,283,155 B1 | 9/2001 | Vu |
| 6,394,138 B1 | 5/2002 | Vu et al. |
| 6,435,215 B1 | 8/2002 | Redemann et al. |
| 6,474,700 B1 | 11/2002 | Redemann et al. |
| 6,502,601 B1 | 1/2003 | Eidsmore et al. |
| 6,546,961 B1 | 4/2003 | Fukushima et al. |
| 6,615,871 B1 | 9/2003 | Morokoshi et al. |
| 6,629,546 B1 | 10/2003 | Eidsmore et al. |
| 6,640,835 B1 | 11/2003 | Rohrberg et al. |
| 6,644,353 B1 | 11/2003 | Eidsmore |
| 6,776,193 B1 | 8/2004 | Eidsmore |
| 2002/0000256 A1 | 1/2002 | Eidsmore et al. |
| 2004/0112446 A1 | 6/2004 | Eidsmore et al. |
| 2004/0112447 A1 | 6/2004 | Eidsmore |
| 2005/0056330 A2 | 3/2005 | Eidsmore et al. |

FOREIGN PATENT DOCUMENTS

| | | |
|---|---|---|
| EP | 0 637 712 B1 | 2/1995 |
| EP | 0 754 896 B1 | 1/1997 |
| EP | 0 715 112 A2 | 5/1997 |
| EP | 0 816 731 B1 | 1/1998 |
| EP | 0 837 278 A1 | 4/1998 |
| EP | 0 844 424 B1 | 5/1998 |
| EP | 0 845 623 B1 | 6/1998 |
| EP | 0 859 155 B1 | 8/1998 |
| EP | 0 905 383 A1 | 3/1999 |
| EP | 0 908 929 B1 | 4/1999 |
| EP | 1 239 203 A1 | 9/2002 |
| WO | WO99/45302 | 9/1999 |

* cited by examiner

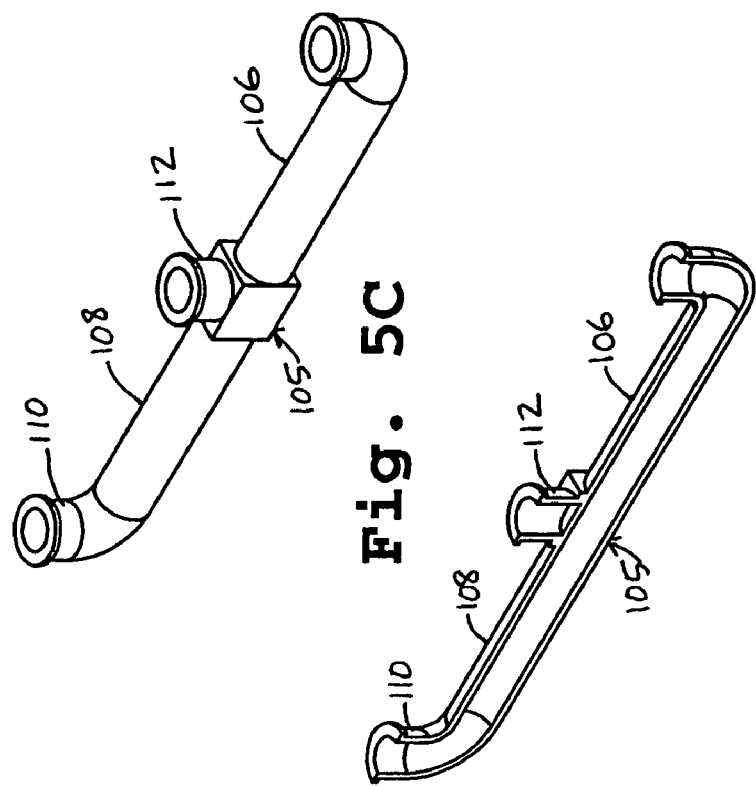
Fig. 5C
Fig. 5D
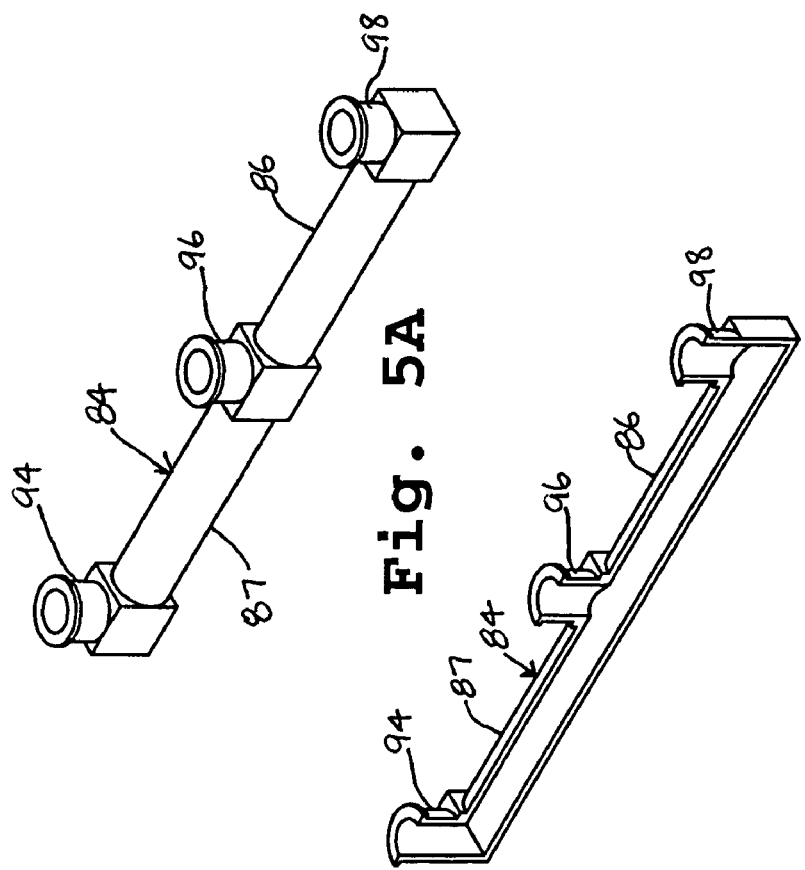
Fig. 5A
Fig. 5B

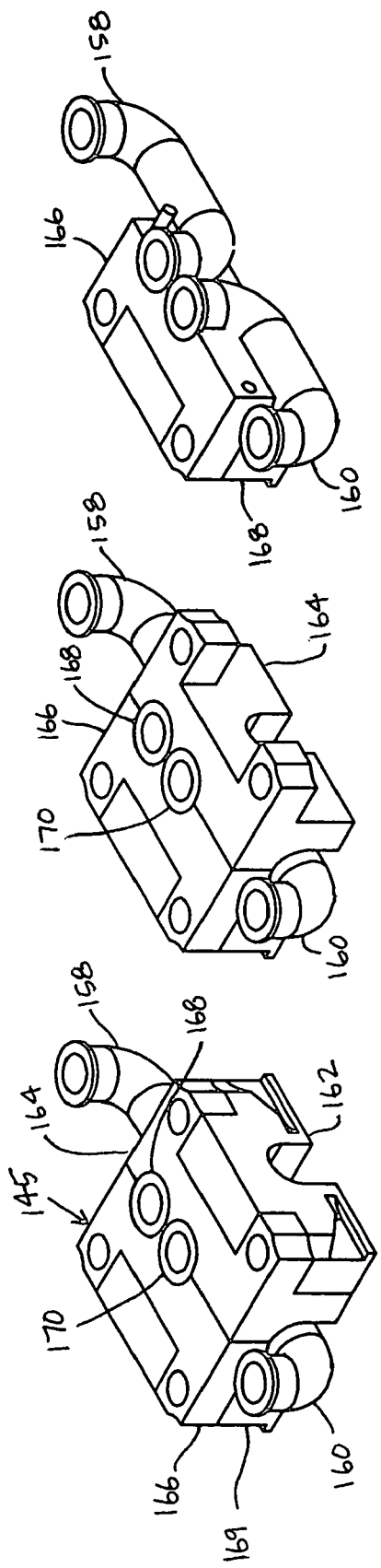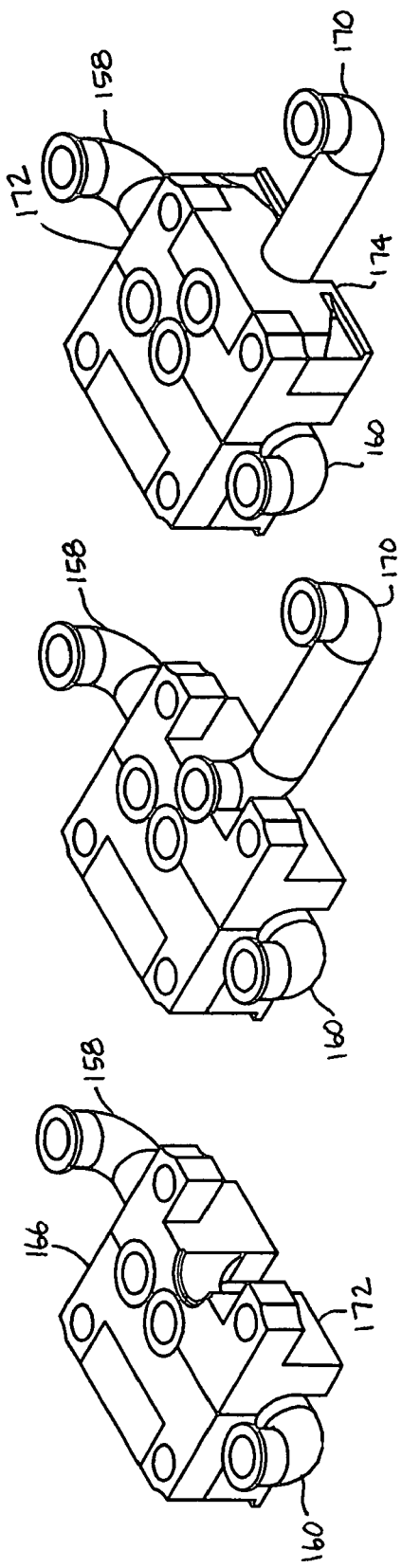

GAS-PANEL ASSEMBLY

FIELD OF THE INVENTION

The present invention relates to a fluid manifold or gas panel assembly and components for constructing the fluid manifold having a plurality of separate fluid-flow pathways.

BACKGROUND OF THE INVENTION

The manufacture of semiconductors involves using gases of very high purity such as oxygen as well as highly corrosive materials. These gases are controlled by fluid manifolds made up of valves, regulators, pressure transducers, mass flow controllers and other components that must maintain the purity of the gas, and also maintain resistance to the corrosive effects of the fluids. Currently, gas panels are used for mixing, pre-mixing, purging, sampling and venting the gases. Typically, the gas panel is used to provide a gas or a mixture of gases into a reaction chamber. These gas panels have historically been made up of hundreds of discreet or individual components, such as valves, filters, flow regulators, pressure regulators, pressure transducers, and connections. The fluid manifolds are designed to provide desired functions, such as mixing and purging, by uniquely configuring the various discreet components.

Modular manifold systems have been introduced into the industry in order to overcome these problems. A gas panel comprising a plurality of modular blocks with passages routed in the blocks is described by Markulec et al. (U.S. Pat. No. 5,836,355). Modular substrate blocks which have both directional and transverse flow direction capabilities united in a single modular substrate block are described by Hollingshead (U.S. Pat. No. 6,085,783). These modular systems were typically fashioned with the entire modular block made of high purity metal required for manufacture of semiconductors. Accordingly, these block components had high manufacturing costs due to the cost of the material and the complexity of machining multiple passageways of a single block.

A modular block using different materials for the fluid passageway and the block is described in Eidsmore et al. (U.S. Pat. No. 6,629,546). In this system, the manifold system includes one or more bridge fittings that are mounted within a channel of a backing plate for structural support or in a support block. Thus, the bridge fittings are supported from beneath. Ohmi et al. (U.S. Pat. No. 6,039,360) describes a gas panel having a holding member with a U-shaped cross-section and a channel member held by the holding member. A disadvantage of these systems is that the configuration of the system cannot be modified without taking the system apart.

The present invention thus seeks to provide a fluid manifold that is rapidly configurable, easily reconfigurable, and cost efficient.

SUMMARY OF THE INVENTION

In one aspect, the invention includes a modular fluid manifold having a plurality of separate fluid-flow pathways. The manifold includes a plurality of pipe modules which form the fluid-flow pathways and a plurality of block modules which can be joined together in various configurations with said pipe modules to form the fluid manifold. The pipe modules each include an elongate pipe section and two or more connectors, each connector having a proximal end section joined in fluid communication with the elongate pipe section and a distal end section terminating at a support structure. In one embodiment, the support structure is a flange.

Each block module in the manifold provides (i) at least one groove formed in the block module, such that the confronting grooves in two block modules, when joined together, form an opening for receiving at least a portion of the connector of the pipe module, thus to support the pipe module at the support structure, or flange, in the joined block modules, and (ii) structure for holding joined block modules in alignment with each other, such that block modules can be removed and replaced without removal of adjacent block or pipe modules.

Each block module also includes structure for mounting the fluid components on the joined blocks, and for mounting the joined blocks on the support. In one general embodiment, the two mounting structures are separate structures, such that mounting a fluid component to a block can be performed independently of mounting a joined block to the support. An exemplary structure for mounting the joined blocks on the support includes one or more slots formed in side regions of the blocks, where each slot is adapted to receive a portion of a washer therein.

In one embodiment, the structure for holding the joined block modules comprises one or more alignment pins and one or more complimentary cavities for receiving the alignment pins. In another embodiment, at least a portion of the joined block modules overlap one another and the structure for holding the joined block modules comprises one or more fasteners for securing the modules.

The pipe modules may be formed of a high-grade, non-corrosive material. In one embodiment, the pipe modules are formed of a material selected from 316L VIM-VAR and Hastelloy™.

In one embodiment, the block modules are formed of a material selected from the group consisting of carbon steel, stainless steel, aluminum, ceramic, and other suitable materials.

The connectors are connected or joined to the elongated section through the distal end section of the connector. In one embodiment, the distal end section includes a Microfit™ fitting. In another embodiment, the distal end section sections is an elbow fitting. In yet another embodiment, the distal end section is a formed elbow. The pipe modules may further include at least one tee fitting.

In another aspect, the invention includes components for constructing the fluid manifold having a plurality of separate fluid-flow pathways. The components include a plurality of pipe modules and a plurality of block modules, which can be joined together in various configurations with said pipe modules to form the fluid manifold.

BRIEF DESCRIPTION OF THE DRAWINGS

FIGS. 5A–5D are perspective and cut-away views of two different three-connector pipe modules;

FIGS. 7A–7F show a perspective view of steps employed in changing a manifold pipe-module configuration, in accordance with the invention.

DETAILED DESCRIPTION OF THE INVENTION

I. Definitions

The terms below have the following meanings unless indicated otherwise.

The terms "fluid manifold" and "gas panel" are used interchangeably, and refer to a system of elements, some including pathways, and fluid components to regulate, transport and/or control a fluid, liquid, and/or vapor.

The term "fluid" as used herein refers fluids, gases, and/or vapors.

An element is in "fluid communication" with another element when a fluid is able to travel from one element to the other via capillary action and/or gravity. The elements do not need to be in direct contact; i.e., other elements through which the fluid can pass may be intervening.

II. Fluid Manifold and Manifold Components

The manifold of the invention, and various components thereof, are illustrated in FIGS. 1–7. As noted above, the device described herein is particularly useful with high purity fluids, gases, and vapors, as used in manufacturing semiconductors. It will be appreciated, however, that the manifold will be useful for any application for providing, maintaining, or regulating fluid, gas, or vapor flow.

Figure 1:
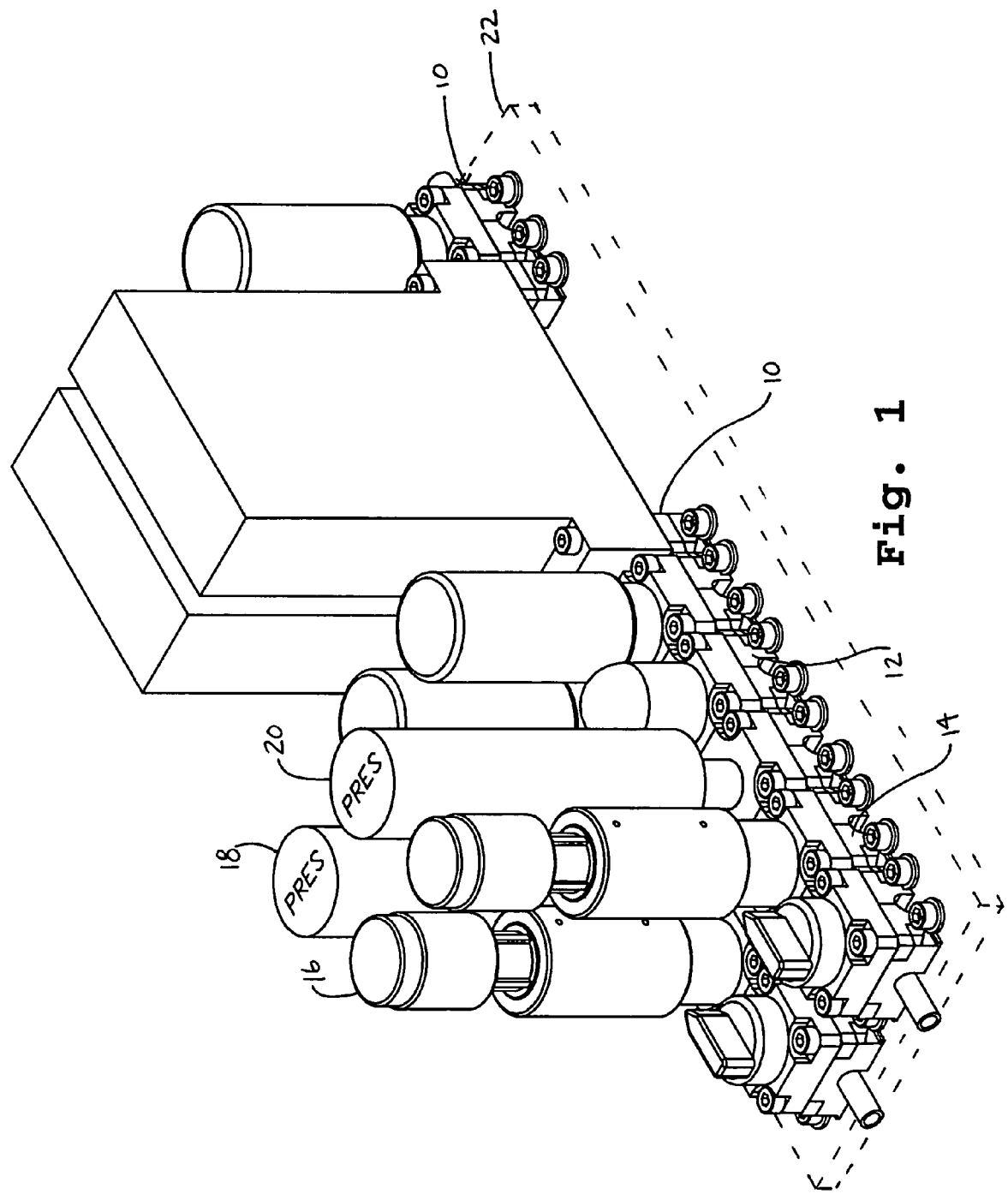
FIG. 1 is a perspective view of a fluid manifold assembly shown with representative fluid components.

With reference to FIG. 1, the components described in detail below are shown in combination to construct a modular fluid manifold 10. As will be described below, the manifold is composed of a plurality of pipe modules (not seen) which form fluid pathways within the manifold, and a plurality of block modules, such as modules 12, 14. The fluid manifold is shown assembled with fluid components, or accessories, such as components, 16, 18, 20, used in conjunction with the fluid manifold. These fluid components are typically flow controls or flow regulators including, but not limited to, valves, flow regulators, pressure regulators, pressure indicators/transducers, and filters. The fluid components may be in fluid communication with any number of various fluid components including fluid flow regulators, fluid sources, pressure transducers, fluid outlets, etc. The fluid components are typically mounted on the surface of the fluid manifold and include an inlet and/or outlet for fluid communication with the components of the fluid manifold. It will be appreciated that the fluid components may be directly or indirectly mounted on the fluid manifold. Where the fluid component is indirectly mounted on the fluid manifold, any number of components including seals, heaters, locators, retainers, and spacers may be positioned between the fluid component and the fluid manifold.

The manifold, and attached fluid components, are mounted on a base or support 22 which is shown in dotted lines. The support is typically wall-mounted or mounted on table legs to bring the support up to a convenient height for the user.

Figure 2A:
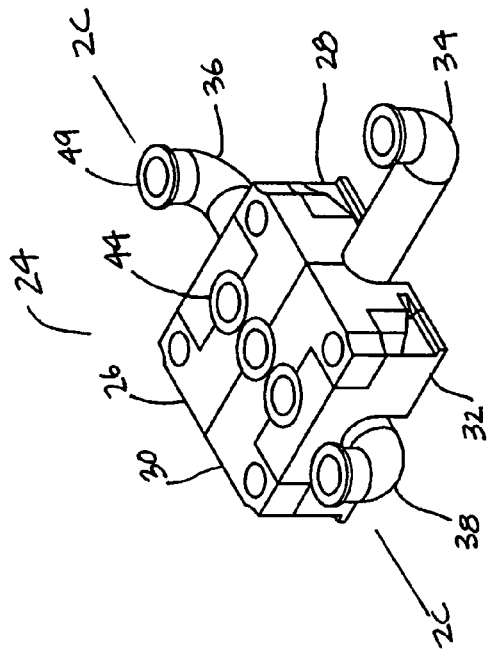
FIGS. 2A–2C show fluid manifold configurations in perspective view (FIG. 2A), perspective, disassembled view (2B), and in sectional view through a sectional line 2C—2C in FIG. 1A (2C)
Figure 2C:
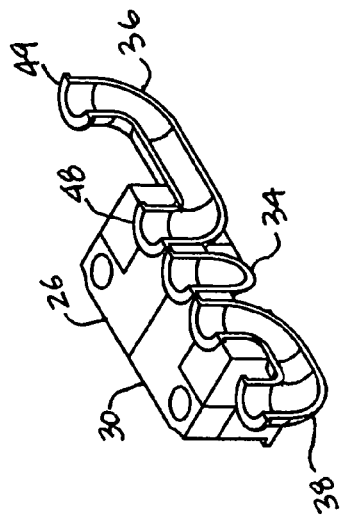
Figure 2B:
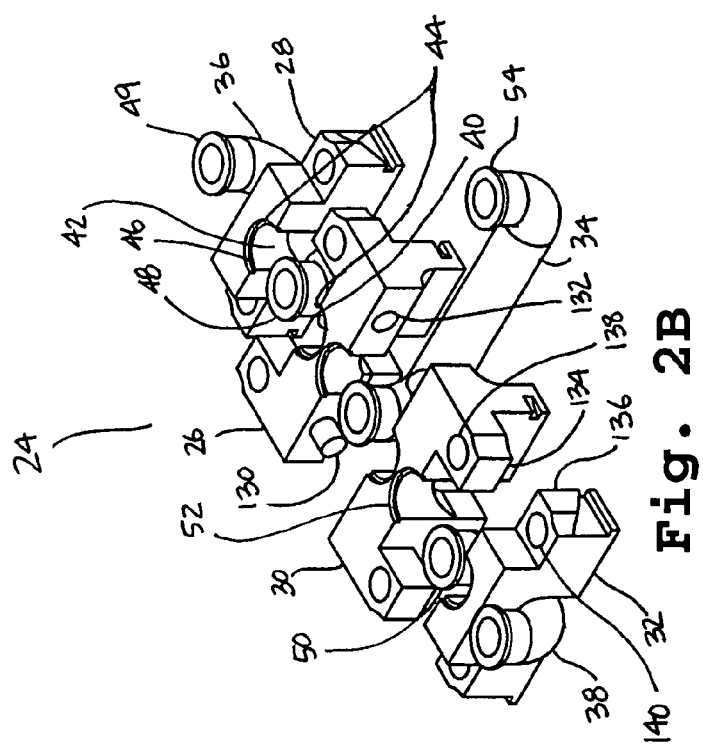
Figure 4A:
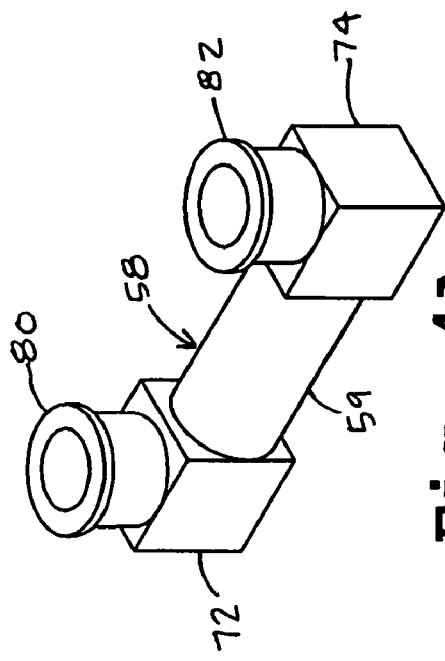
FIGS. 4A–4B are perspective and cut-away views, respectively, of a pipe module having Microfit™ elbow connections.
Figure 4B:
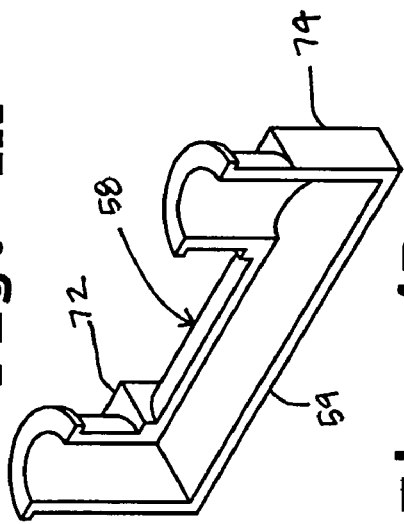

FIGS. 2A–2C illustrate a modular unit 24 in the manifold. As seen in FIG. 2A four block modules, including modules 26, 28, 30, and 32, and three pipe modules 34, 36, 38 are utilized to form the modular unit. FIG. 2A shows the unit in a fully assembled form, with each of the three pipe units supported within the structure formed by the four block units. Each block module, such as module 26, includes a groove or cut-out section, such as groove 40 in module 26 and groove 42 in module 28. Each groove in turn, may be recessed at the upper surface of the block module, such as recess 46 in module 28 and recess 52 in module 30, to provide a seat for a flange, such as flange 48 in pipe module 36, to support the flanged end of the pipe module in the block unit, when the two confronting block modules, in this case, modules 26 and 28 are joined together with their grooves, such as grooves 40, 42, confronting one another. That is, the confronting grooves form an opening, such as opening 44 through which the distal pipe section is received, with the flange of the pipe support within and on the recess formed by the two grooves. As will be appreciated, the flange in the opening recess supports the associated end of the pipe module within the joined block sections, with the other end of the pipe module being similarly supported in an adjacent block unit.

The block modules are preferably formed of an inexpensive and/or lightweight material. Such materials include different grades of stainless steel, different grades of aluminum, ceramic, sintered metals, stamped metals, and forged metals. In a preferred embodiment, the block modules are formed of stainless steel or aluminum.

Each pipe module shown in FIGS. 2A–2C includes a free, unsupported end which will become supported by an adjacent block unit constructed adjacent unit 24 and also forming part of the manifold. That is, each pipe module is supported at one end within one block unit, and at its other end by an adjacent unit. More specifically, and as will be described below, each pipe module includes a support structure, for example a flange, such as flange 48 supported in module unit 24, and flange 50 supported in an adjacent module. The flanges, such as flanges 48, 49, 50, 54, are designed and dimensioned to be received in recesses, such as recesses 46 and 52. It will be appreciated that the recess may be dimensioned such that the flange rests flush with the upper surface of the block module. Alternatively, the recess may be dimensioned such that the flange is recessed from the block module upper surface, not shown. In this embodiment, the flange may be recessed sufficiently to partially or wholly receive a seal, such as an o-ring, metal washer, C seal, W seal, or any other seal known in the art. The flanges may be attached to the distal end of the pipe modules by welding or other known means Alternatively, the flange may be formed at the distal end of the connector section. In one embodiment, not shown, the connector extends through opening of the joined block module grooves and the flange rests on the top surface of the block module.

Figure 3A:
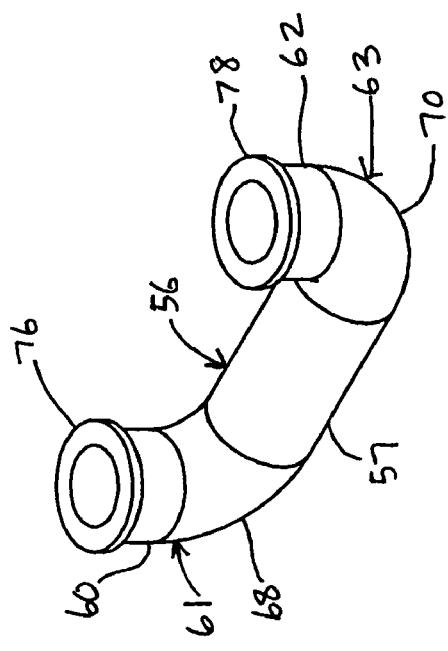
FIGS. 3A–3B are perspective and cut-away views, respectively, of a pipe module having elbow connections.
Figure 3B:
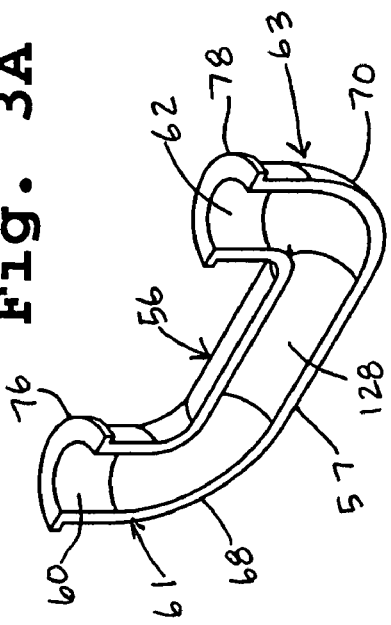

FIGS. 3A and 3B, 4A and 4B illustrate two different types of pipe modules, indicated at 56 and 58, respectively, suitable in the invention. FIGS. 3A–3B show a perspective and cut-away views of pipe module 56 whose fluid flow path is defined an elongate section 57 joined to connectors 61, 63 at either end. Each connector is formed of a distal end section, such as distal end section 60 in connector 61 and distal end section 62 in connector 63, and a proximal end section, such as proximal end section 68 in connector 61 and proximal end section 70 in connector 63 which joins the connector in fluid communication to the associated end of the elongate pipe section. Thus, each pipe module forms a fluid-flow pathway, indicated at 128 in pipe module 56 defined by the elongate pipe section and terminal connectors.

In the embodiment shown in FIGS. 3A–3B, the connector distal end sections include a formed, continuous pipe elbow. In the embodiment shown in FIGS. 4A–4B, the connector distal end sections include a Microfit™ elbow fitting 72, 74, joined to an elongate pipe section 59. It will be appreciated that the elongate section may be joined to a connector by any suitable fitting or bend pipe section.

As noted above, a distal end section of the connector includes structure for supporting the pipe module. In a preferred embodiment, this structure is a flange, such as flanges 76, 78 in pipe module 56, and flanges 80, 82, in pipe module 58. In other embodiments, the structure for supporting the pipe module in a block module can be one or more pins or a collar attached in the distal end section for engaging complementary recess structure in the two block modules that will support the pipe modules. For convenience, the pipe modules will be discussed hereafter as including a distal-end flange.

The elongate section may be welded or otherwise permanently joined to the connectors, as described above. In another embodiment, a weldless system may be used, especially for an ultra clean application. The pipe module may further comprise two elbow type fittings joined together without an elongate pipe section, not shown. In yet another embodiment, all or part of the pipe module, including elongate member, connector sections, and flanges may be formed of a single piece, not shown. The elongate pipe section and connector sections are typically joined to form a U-shape or W shape (three connectors), however, other shapes are possible. In another embodiment, the pipe modules include one or more external connections that may serve as an inlet and/or outlet for connection of a fluid line or source, a waste or overflow receptacle, or the reaction chamber. The external connections may include any suitable fitting, such as a VCR connection, not shown, for connection to an external source, purge, receptacle, or waste.

For ultra-high purity embodiments, the fluid-flow pathway, such as pathway 128, may be internally electropolished and/or finished according to known methods to prevent corrosion and to provide an ultra-clean environment. In a preferred embodiment, all wetted surfaces including the fluid-flow pathway and flanges are electropolished.

The pipe modules may be formed of any material suitable for the application. For ultra-high purity applications, the pipe modules may be formed of high-grade stainless steel such as 304SS and 316SS, nickel alloys, sintered alloys, ceramic, high grade aluminum, tungsten alloys, and titanium alloys. In a preferred embodiment, at least the wet surfaces (flow path and the flange) of the pipe modules are formed of a non-corrosive, corrosion resistant, or non-reactive metal or alloy. In a more preferred embodiment, the pipe modules are formed of 316L VIM-VAR or an alloy such as Hastelloy™ (available from Haynes International). For industrial uses, any suitable plastic or metal is suitable. It will be appreciated that each of the elongate section, connector sections and flanges may be formed of a different material. It will further be appreciated that the block modules may, but need not be, formed of the same material as the pipe modules.

The pipe module may have other configurations in response to the necessary functions of the fluid manifold. FIGS. 5A–5B show a perspective and cut-away view of a three-connector pipe modules 84 having both end and internal connectors 94, 96, 98 as shown, and two elongate pipe sections, such as sections 86, 87, each being connected at an end to one of the connectors, as shown. As seen in FIGS. 5C–5D the pipe module may include a combination of fittings. In this embodiment, a pipe module 105 includes a pair of elongate pipe sections 106, 108, each joined to an end connector, such as connector 110, through an elbow joint and to an internal connector, such as connector 112, through another type of fitting. The three-connector pipe modules just illustrated is used where it is desired to have two input gases enter and mix in a single pathway, or a single gas input distributed to two different gas accessories.

With further reference to FIGS. 2A–2C, the block modules may further include at least one structure for holding the block modules in alignment with each other. In one embodiment, the structure for holding the block modules in alignment includes at least one alignment pin, such as pin 130 and a cavity or recess, such as recess 132 for receiving the pin on an adjacent block module, such that when the block modules are joined, the alignment pin is at least partially retained in the cavity. In another embodiment, seen in FIG. 2B, the block modules may be formed to include overlapping sections, such as sections 134, 136 such that when two block modules are joined or mated, the sections at least partly overlie each other. It will be appreciated that the block modules may include more than one of the same type of alignment structure.

As described above, the fluid components are designed to mounted on the upper surface of the modular-block manifold. In one embodiment, the block modules include structure for mounting the fluid components on the upper surface of joined blocks. In a preferred embodiment, the block modules include slots, such as slots 138, 140 for fastening the fluid component to the block module. In one embodiment, the top slot, such as slot 138 may have a smooth bore, to allow insertion of a bolt, and at least a part of the lower slot be threaded for fastening the bolt. Fasteners pass through openings in the base of the fluid components to secure the fluid components to the block modules. In a further embodiment, the screw or bolt passes through both block slots, such as slots 138, 140 and block modules, such as modules 30, 32 and is secured directly to base 22. In this embodiment, structure for mounting a gas component to the manifold is also the structure used in mounting the manifold on a base.

Figure 6C:
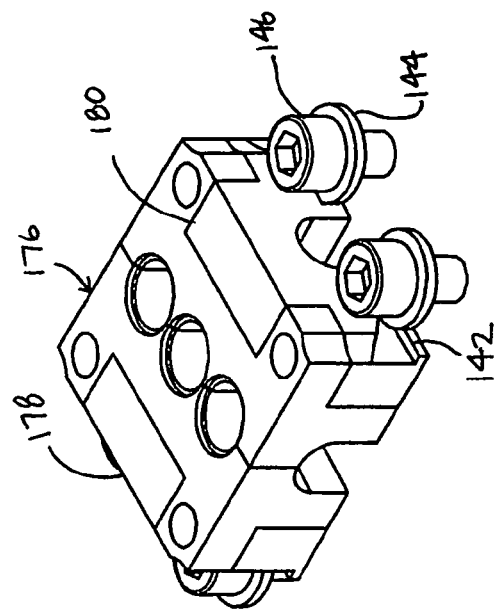
FIGS. 6A–6C show an embodiment of structure used in mounting a manifold block to a support.
Figure 6B:
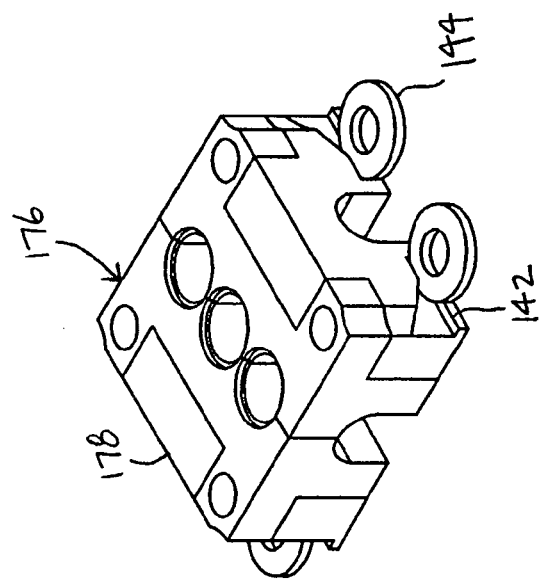
Figure 6A:
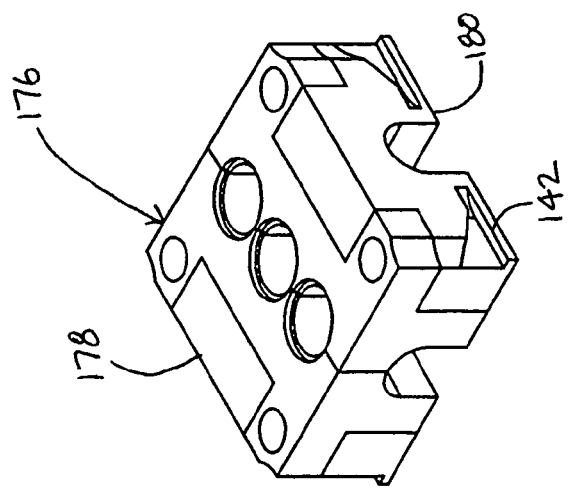

As illustrated in FIGS. 1, and 6A–6C, the block modules may include separate structure for mounting the module units 176 to the support, base plate, or back plate 22, shown in FIG. 1. As seen in FIG. 6A–6C, the mounting structure may include a ledge or slot 142 formed in a side region of at least some of the blocks 178, 180 for mounting the block module, and thus the module unit, to the back plate. In this embodiment, each slot is adapted to receive a portion of a washer 144 or other suitable component such that the washer at least partially overlaps the ledge on the block module. The washer is fastened to the base plate by a fastener 146 or any other suitable means including clamps, pins, and screws. In a preferred embodiment, the block units are secured at each corner to the base plate with the mounting structure 146.

The base plate will typically be a flat, rectangular plate, but can be any suitable shape or configuration. The width of the base plate is sized to accommodate at least one block module. Alternatively, the width may be sized to accommodate two or more block modules (as in FIG. 1). Alternatively, two or more base plates may be used in combination, where the base plates are either adjacent or placed end to end, to form the fluid manifold. The length of the base plate is sized according to the number of block modules required for the fluid manifold. It will be appreciated that two or more fluid manifolds may be connected. The base plate will typically include at least one cavity for receiving the module unit fastener 146. The base plate may be comprised of any suitable material, including, but not limited to metal and metal matrix composites. The base plate is preferably comprised of an inexpensive and/or lightweight material such as aluminum or stainless steel. In another embodiment, the base plate is comprised of plastic.

In another embodiment, the fluid manifold may be assembled as a multi-level manifold having two or more levels. In this embodiment, the fluid manifold is assembled as previously described with some modifications. The multi-level manifold includes an upper base plate and a lower base plate each with a fluid manifold assembled thereon. The upper and lower base plates may be separated by optional support blocks. The levels of the fluid manifold may be in fluid communication using a pipe module that connects the upper and lower levels. The upper and lower base plates may be fastened by any known means including clips, clamps, bolts and/or screws.

The present invention allows for convenient reconfiguration of the unit modules. That is, it allows configuration of the manifold to be modified, e.g., to introduce another type of pipe module, without having to remove or adjust the position of an adjacent block module. This feature is illustrated in FIGS. 7A–7F, which show a block unit 145 composed of four block units 162, 164, 166, and 169, and providing two openings 168, 170 for supporting connector ends of pipe modules 158, 160, respectively. In the particular example illustrated, it is desired to add a third pipe module 170 to the manifold adjacent these two pipe module ends, as shown at FIG. 7F.

To make this modification to the manifold, the fluid component on the block unit, if present, is first removed from upper surface of the block module. To remove block module 162, any structure for mounting the block module to the support or back plate is removed. Block modules 162, 164 are then removed, as illustrated in FIGS. 7B and 7C, respectively. A block module 172 having grooves for receiving three pipe modules, as seen in FIG. 7D, is then added, with attachment of this module acting to secure pipe modules 158, 160 in the manifold. The additional pipe module 170 is then added, as in FIG. 7E, and this pipe is secured in place and supported by attachment of a new block module 174 to the manifold, as shown in FIG. 7F.

It will be appreciated that any number of block modules and/or pipe modules may be removed and/or added to form the required configuration. In the present example, is noted that the existing pipe modules 158, 160 were not disturbed or removed and the configuration of the adjacent block modules was not changed. In particular, because the pipe modules are supported only at their upper connector ends, rather than internally within the block at their elongate pipe sections, it is possible to perform a number of modifications and replacements with without needing to remove existing pipe modules and/or to remove underlying block modules.

The foregoing description of the embodiments of the present invention has been provided for the purposes of illustration and description. It is not intended to be exhaustive or to limit the invention to the precise embodiments disclosed. Obviously, many modifications and variations will be apparent to those skilled in this art. It is intended that the scope of the invention be defined by the following claims and their equivalents.

It is claimed:

1. Components for constructing a fluid manifold having a plurality of separate fluid-flow pathways, where the manifold is designed to be carried on a support, and to hold a plurality of fluid components in fluid communication with said pathways, said components comprising:

a plurality of pipe modules which form said fluid-flow pathways and which each includes an elongate pipe section and two or more connectors, each connector having a proximal end section joined in fluid communication with the elongate pipe section and a distal end section terminating at a flange;

a plurality of block modules which can be joined together in various configurations with said pipe modules to form the fluid manifold, where each block module provides:

(i) at least one groove formed in the block module, such that confronting grooves in two block modules, when the modules are joined together, form an opening for receiving at least a portion of the connector in the pipe module, wherein the pipe module is supported in the joined block modules by its flange, (ii) structure for holding joined block modules in alignment with each other, wherein block modules can be removed and replaced without removal of adjacent block or pipe modules; and (iii) structure for mounting said fluid components on said joined blocks, and for mounting said joined blocks on said support.

2. The components of claim 1, wherein said pipe modules are formed of a high-grade, non-corrosive material.

3. The components of claim 2, wherein said pipe modules are formed of a material selected from the group consisting of 304 stainless steel, 316L VIM-VAR, Hastelloy™, aluminum, and ceramic.

4. The components of claim 1, wherein said block modules are formed of a material selected from the group consisting of stainless steel and aluminum.

5. The components of claim 1, wherein the distal end section of at least one connector includes a Microfit™ fitting joining the connector to the elongate pipe section.

6. The components of claim 1, wherein the distal end section of at least one of said connectors includes an elbow fitting joining the connector to the elongate pipe section.

7. The components of claim 1, where at least one of said plurality of pipe modules further includes at least one tee fitting.

8. The components of claim 1, wherein said structure for holding the joined block modules comprises one or more alignment pins and one or more complimentary cavities for receiving the alignment pins.

9. The components of claim 1, wherein said structure for mounting said fluid components on said joined blocks is separate from the structure for mounting said joined blocks on said support, such that mounting a fluid component to a block can be performed independently of mounting a joined block to the support.

10. The components of claim 9, wherein said structure for mounting said joined blocks on said support includes one or more slots formed in side regions of said blocks, said each slot being adapted to receive a portion of a washer therein.

11. A modular fluid manifold having a plurality of separate fluid-flow pathways, said manifold being designed to be carried on a support, and to hold a plurality of fluid components in fluid communication with said pathways, said manifold comprising:

a plurality of pipe modules which form said fluid-flow pathways and which each includes an elongate pipe section and two or more connectors, each connector having a proximal end section joined in fluid communication with the elongate pipe section and a distal end section terminating at a flange;

a plurality of block modules which are joined together in one of a plurality of possible configurations with said pipe modules to form the fluid manifold, where each block module provides:
(i) at least one groove formed in the block module, such that the confronting grooves in two block modules, when the modules are joined together, form an opening for receiving at least a portion of the connector section of the pipe module, wherein the pipe module is supported in the joined block modules by its flange,
(ii) structure for holding joined block modules in alignment with each other, wherein block modules can be removed and replaced without removal of adjacent block or pipe modules; and
(iii) structure for mounting said fluid components on said joined blocks, and for mounting said joined blocks on said support.

12. The fluid manifold of claim 11, wherein said pipe modules are formed of a high-grade, non-corrosive material.

13. The fluid manifolds of claim 12, wherein said plurality of pipe modules are formed of a material selected from the group consisting of 304 stainless steel, 316L VIM-VAR, Hastelloy™, aluminum, and ceramic.

14. The fluid manifold of claim 11, wherein said plurality of block modules are formed of a material selected from the group consisting of stainless steel and aluminum.

15. The fluid manifold of claim 11, wherein the distal end section of at least one connectors includes a Microfit™ fitting joining the connector to the elongate pipe section.

16. The components of claim 11, wherein the distal end section of at least one of said connectors includes an elbow fitting joining the connector to the elongate pipe section.

17. The fluid manifold of claim 11, where at least one of said plurality of pipe modules further includes at least one tee fitting.

18. The fluid manifold of claim 11, wherein said structure for holding the joined block modules comprises one or more alignment pins and one or more complimentary cavities for receiving the alignment pins.

19. The fluid manifold of claim 11, wherein at least a portion of the joined block modules overlap one another and said structure for holding the joined block modules comprises one or more fasteners for securing the modules.

20. The fluid manifold of claim 11 wherein said structure for mounting said fluid components on said joined blocks is separate from the structure for mounting said joined blocks on said support, such that mounting a fluid component to a block can be performed independently of mounting a joined block to the support.

21. The fluid manifold of claim 20, wherein said structure for mounting said joined blocks on said support includes one or more slots formed in side regions of said blocks, said each slot being adapted to receive a portion of a washer therein.

* * * * *